US011454354B2

(12) United States Patent
Kusumoto

(10) Patent No.: US 11,454,354 B2
(45) Date of Patent: Sep. 27, 2022

(54) PIPE DIAGNOSIS APPARATUS, ASSET MANAGEMENT APPARATUS, PIPE DIAGNOSIS METHOD, AND COMPUTER-READABLE RECORDING MEDIUM

(71) Applicant: NEC Corporation, Tokyo (JP)

(72) Inventor: Manabu Kusumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 16/496,524

(22) PCT Filed: Jan. 17, 2018

(86) PCT No.: PCT/JP2018/001254
§ 371 (c)(1),
(2) Date: Sep. 23, 2019

(87) PCT Pub. No.: WO2018/179691
PCT Pub. Date: Oct. 4, 2018

(65) Prior Publication Data
US 2020/0378561 A1 Dec. 3, 2020

(30) Foreign Application Priority Data
Mar. 28, 2017 (JP) .............................. JP2017-062650

(51) Int. Cl.
F17D 5/06 (2006.01)
G06F 30/28 (2020.01)
G01M 3/28 (2006.01)

(52) U.S. Cl.
CPC ............... F17D 5/06 (2013.01); G06F 30/28 (2020.01); G01M 3/2815 (2013.01)

(58) Field of Classification Search
CPC ......... F17D 5/06; G06F 30/28; G01M 3/2815
See application file for complete search history.

(56) References Cited

U.S. PATENT DOCUMENTS 2,661,898 A * 12/1953 Bubb ....................... G06G 7/57
703/10
4,559,610 A * 12/1985 Sparks ..................... G06G 7/57
700/282
10,474,776 B2 * 11/2019 Kusumoto .............. G06F 30/00
(Continued)

FOREIGN PATENT DOCUMENTS

JP 08122221 A * 5/1996
JP H11-14782 A 1/1999
(Continued)

OTHER PUBLICATIONS

Extended European Search Report for EP Application No. EP18775903.0 dated Jun. 8, 2020.
(Continued)

Primary Examiner — Toan M Le
Assistant Examiner — Xiuqin Sun

(57) ABSTRACT

A pipe diagnosis apparatus 10 includes a simulation execution unit 11 that simulates vibrations of pressure in a pipe included in piping equipment to be diagnosed, based on pipe information for specifying a configuration of the piping equipment, and a stress analysis unit 12 that calculates stress that occurs in a pipe included in the piping equipment, based on pressure vibrations acquired through simulation.

9 Claims, 11 Drawing Sheets

(56) References Cited

U.S. PATENT DOCUMENTS

| | | | |
|---|---|---|---|
| 2006/0283251 A1 | 12/2006 | Hunaidi et al. | |
| 2010/0256963 A1* | 10/2010 | Takahashi | G21D 3/001 703/9 |
| 2015/0308627 A1 | 10/2015 | Hoskins et al. | |
| 2017/0308635 A1 | 10/2017 | Kusumoto et al. | |

FOREIGN PATENT DOCUMENTS

| | | | |
|---|---|---|---|
| JP | 2013-061350 A | 4/2013 | |
| JP | 5329871 B2 | 10/2013 | |
| JP | 2014-098584 A | 5/2014 | |
| JP | 2016-509198 A | 3/2016 | |
| WO | 2016/067559 A1 | 5/2016 | |

OTHER PUBLICATIONS

Ding Yuqi et al: "Analysis on the Vibration and Cracking Failure of Feeder Pipeline in Ammonia Synthesis Tower", , Journal of Failure Analysis and Prevention, Springer, Boston, vol. 17, No. 2, Jan. 17, 2017 (Jan. 17, 2017), pp. 235-247, XP036190817, ISSN: 1547-7029, DOI:10.1007/S11668-017-0234-2.
International Search Report for PCT Application No. PCT/JP2018/001254, dated Apr. 24, 2018.

\* cited by examiner

PIPE DIAGNOSIS APPARATUS, ASSET MANAGEMENT APPARATUS, PIPE DIAGNOSIS METHOD, AND COMPUTER-READABLE RECORDING MEDIUM

This application is a National Stage Entry of PCT/JP2018/001254 filed on Jan. 17, 2018, which claims priority from Japanese Patent Application 2017-062650 filed on Mar. 28, 2017, the contents of all of which are incorporated herein by reference, in their entirety.

TECHNICAL FIELD

The present invention relates to a pipe diagnosis apparatus and a pipe diagnosis method for diagnosing a failure risk of piping equipment such as water supply equipment, and further relates to a computer-readable recording medium in which programs for realizing the apparatus and method are stored, and an asset management system in which the pipe diagnosis apparatus is used.

BACKGROUND ART

The scale of piping equipment such as water supply pipe networks are often incredibly large. In addition, progression of deterioration of a pipe buried under ground may differ according to the acidity, potential, pressure, and the like of the soil in which the pipe is buried. Therefore, there are cases where a relatively new pipe deteriorates rapidly and needs to be replaced at an early stage. Thus, there is demand for techniques for appropriately diagnosing the current degree of deterioration of a pipe and future progression of the deterioration so as to enable accurate and efficient repairing and replacement of the pipe.

Regarding a technique for diagnosing the current degree of deterioration of a pipe, Patent Document 1 discloses a technique related to non-destructive inspection of a pipe. In the technique disclosed in Patent Document 1, first, an actual measurement value indicating the propagation speed of vibrations that propagate along a pipe through two points that are spaced apart in the longitudinal direction of the pipe is acquired. Subsequently, the thickness of the pipe is back-calculated by adapting the actual measurement value to an equation for obtaining the thickness of a pipe from the value of propagation speed.

Then, in the technique disclosed in Patent Document 1, the current degree of deterioration of the pipe is determined based on the calculated thickness of the pipe, and progression of the deterioration of the pipe is diagnosed.

In addition, Patent document 2 discloses a technique for estimating the amount of leaked water in a pipe network by utilizing simulation of the pipe network. Specifically, in the technique disclosed in Patent document 2, optimization computation is performed such that a result of analyzing hydraulic pressure matches an actual measurement result, to calculate a demand amount, and the amount of leaked water is estimated based on the calculated demand amount and a night-time minimum usage amount. It is conceivable that, if the amount of leaked water of a pipe network can be estimated using a simulator in this manner, the progression of deterioration of the pipe network can be estimated.

LIST OF RELATED ART DOCUMENTS

Patent Document

Patent document 1: Japanese Patent Laid-Open Publication No. 2013-61350
Patent document 2: Japanese Patent No. 5329871

SUMMARY OF INVENTION

Problems to be Solved by the Invention

Incidentally, in an ordinary pipe network, due to the use of a fluid in a pipe and a change in circumstances, pressure vibrations of the fluid occur upon quick opening/closing of a valve, generation and collapse of an air bubble, and opening/closing of a faucet when a consumer uses the fluid. Such pressure change causes stress change in a pipe, and fatigues the pipe. Then, if stress changes occur repeatedly over long periods of use, fatigue progresses and the pipe breaks. Therefore, in order to estimate a time to replace each pipe of a water pipe network, it is important to evaluate pressure change that occurs in the pipes, and to estimate the speed of progression of fatigue.

However, in the technique disclosed in Patent document 1 above, it is impossible to evaluate pressure change in a pipe network. Therefore, it is also impossible to estimate the future progression speed of deterioration of a water pipe and the lifespan of the water pipe based thereon. Therefore, an appropriate time to replace the pipe cannot be estimated, and a problem arises in that water supply businesses cannot determine economically efficient replacement priorities for a large number of pipes owned by them.

Moreover, in the technique disclosed in Patent document 2, the amount of leaked water in a pipe network is only estimated through simulation, and a dynamic pressure change such as water hammer cannot be analyzed, and thus it is also impossible to evaluate a pressure change using this technique.

An example object of the invention is to provide a pipe diagnosis apparatus, an asset management apparatus, a pipe diagnosis method, and a computer-readable recording medium that enable estimation of future progression of deterioration of pipes in piping equipment, in light of the above-described issues.

Means for Solving the Problems

In order to achieve the aforementioned object, a pipe diagnosis apparatus according to an example aspect of the invention includes:

a simulation execution unit configured to simulate a pressure vibration in a pipe included in piping equipment to be diagnosed, based on pipe information for specifying a configuration of the piping equipment; and a stress analysis unit configured to calculate stress that occurs in a pipe included in the piping equipment, based on a pressure vibration acquired through simulation.

In addition, in order to achieve the aforementioned object, an asset management apparatus according to an example aspect of the invention includes:

a simulation execution unit configured to simulate a pressure vibration in a pipe included in piping equipment to be diagnosed, based on pipe information for specifying a configuration of the piping equipment;

a stress analysis unit configured to calculate stress that occurs in a pipe included in the piping equipment, based on a pressure vibration acquired through simulation;

a failure risk estimation unit configured to estimate a failure risk of the piping equipment based on the stress calculated by the stress analysis unit and a strength of a pipe included in the piping equipment; and a replacement priority setting unit configured to set a replacement priority of each pipe included in the piping equipment, based on the failure risk estimated by the failure risk estimation unit.

In addition, in order to achieve the aforementioned object, a pipe diagnosis method according to an example aspect of the invention includes:

(a) a step of simulating a pressure vibration in a pipe included in piping equipment to be diagnosed, based on pipe information for specifying a configuration of the piping equipment; and (b) a of calculating stress that occurs in a pipe included in the piping equipment, based on a pressure vibration acquired through simulation.

Furthermore, in order to achieve the aforementioned object, a computer-readable recording medium according to an example aspect of the invention includes a program recorded thereon, the program including instructions that cause a computer to carry out:

(a) a step of simulating a pressure vibration in a pipe included in piping equipment to be diagnosed, based on pipe information for specifying a configuration of the piping equipment; and (b) a step of calculating stress that occurs in a pipe included in the piping equipment, based on a pressure vibration acquired through simulation.

Advantageous Effects of the Invention

As described above, according to the invention, it is possible to estimate future progression of deterioration of a pipe in piping equipment.

EXAMPLE EMBODIMENT

First Example Embodiment

A pipe diagnosis apparatus, a pipe diagnosis method, and a computer-readable recording medium in this first example embodiment will be described below with reference to FIGS. 1 to 3.

[Apparatus Configuration]

First, a schematic configuration of the pipe diagnosis apparatus in the first example embodiment will be described with reference to FIG. 1. FIG. 1 is a block diagram illustrating a schematic configuration of the pipe diagnosis apparatus in the first example embodiment of the invention.

Figure 1:
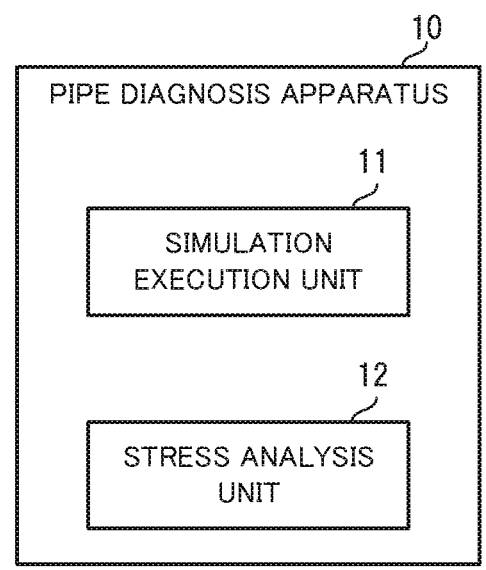
FIG. 1 is a block diagram illustrating a schematic configuration of a pipe diagnosis apparatus in a first example embodiment of the invention.

A pipe diagnosis apparatus 10 in the first example embodiment shown in FIG. 1 is an apparatus for diagnosing deterioration of piping equipment to be diagnosed. As shown in FIG. 1, the pipe diagnosis apparatus 10 is provided with a simulation execution unit 11 and a stress analysis unit 12.

The simulation execution unit 11 simulates vibrations of pressure in pipes included in piping equipment to be diagnosed, based on pipe information for specifying a configuration of the piping equipment. The stress analysis unit 12 calculates stress that occurs in pipes included in the piping equipment, based on pressure vibrations acquired through simulation.

In this manner, in the first example embodiment, stress that will occur in the future in the piping equipment to be diagnosed is calculated. In addition, stress that occurs in a pipe causes deterioration and consequent fracture of the pipe. Thus, according to the present example embodiment, in piping equipment, it is possible to estimate future progression of deterioration of pipes.

Subsequently, the configuration of the pipe diagnosis apparatus of the first example embodiment will be described more in detail with reference to FIG. 2. FIG. 2 is a block diagram illustrating a specific configuration of the pipe diagnosis apparatus in the first example embodiment of the invention.

Figure 2:
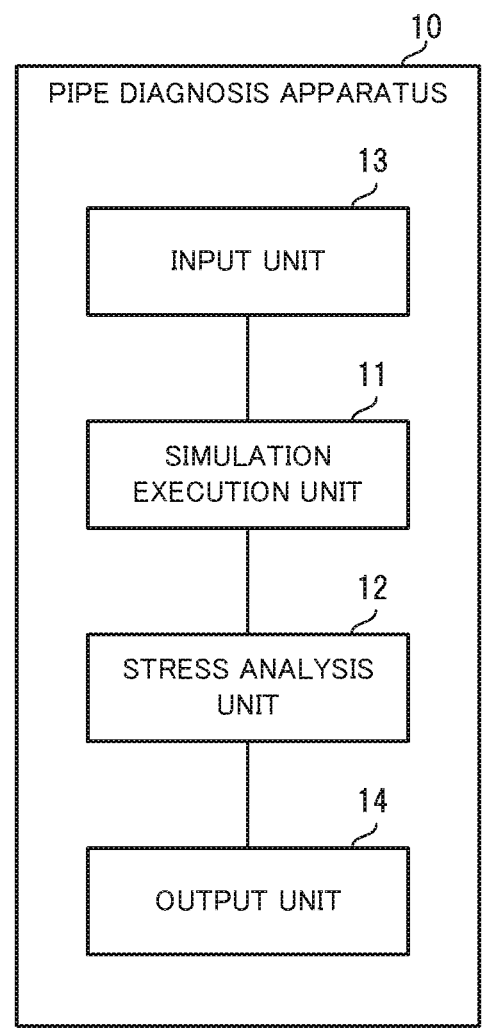
FIG. 2 is a block diagram illustrating a specific configuration of the pipe diagnosis apparatus in the first example embodiment of the invention.

As shown in FIG. 2, in the first example embodiment, the pipe diagnosis apparatus 10 is provided with an input unit 13 and an output unit 14 in addition to the simulation execution unit 11 and the stress analysis unit 12, which have been described above.

Out of these units, the input unit 13 accepts an instruction from the outside. For example, when an instruction to start pipe diagnosis is given, the input unit 13 accepts this instruction, and passes the accepted instruction to the simulation execution unit 11.

The input unit 13 also accepts pipe information from the outside, and inputs the accepted pipe information to the simulation execution unit 11. The input unit 13 can also provide an input screen, on a screen of a terminal apparatus connected to the pipe diagnosis apparatus 10. In this case, the user of the pipe diagnosis apparatus 10 can input the pipe information using the screen of their own terminal apparatus.

In addition, the output unit 14 outputs a result of calculation performed by the stress analysis unit 12, to the outside. Specifically, the output unit 14 outputs a calculation result to a terminal apparatus connected to the pipe diagnosis apparatus 10 or a display apparatus connected to the pipe diagnosis apparatus 10. In this case, the calculation result is displayed on a screen of the terminal apparatus or the display apparatus. The user can check the calculation result on the screen.

As described above, the pipe information is information that is used for simulating a fluid that flows through pipes included in piping equipment. Specifically, the pipe information at least includes connection relationship (layout of pipes), and the length and diameter (caliber), an internal friction coefficient, and the propagation speed of pressure waves of each of the pipes included in the piping equipment. In addition, the pipe information may further include information regarding elements that affect pressure vibrations of pipes, for example, a tank and a valve. Furthermore, the friction coefficient and propagation speed can be calculated from the material of the pipe, the roughness of the inner surface, and the like, and thus information for calculating the friction coefficient and propagation speed may also be included instead of the friction coefficient and propagation speed.

In addition, in the first example embodiment, a water pipe network is used as the piping equipment to be subjected to deterioration diagnosis. If the piping equipment is a water pipe network, the pipe information may additionally include information regarding the amount of water used by consumers that use water from the water pipe network, a water reservoir connected to the water pipe network, a tank connected to the water pipe network similarly, a pressure reducing valve, and the like.

In the first example embodiment, the simulation execution unit 11 simulates pressure vibrations in pipes included in the piping equipment, based on the pipe information that has been input from the input unit 13. Here, if the piping equipment is a water pipe network, simulating pressure vibrations is obtaining how vibrations caused by a pressure change due to a consumer using water, a valve being opened/closed, or the like propagate through the pipe network.

In addition, in the first example embodiment, the simulation execution unit 11 builds an electric circuit equivalent to the piping equipment using the pipe information, and executes simulation using a voltage in the electric circuit as pressure in the pipes. Specifically, the simulation execution unit 11 expresses, as an electric circuit network, the behavior of a fluid that flows through the piping equipment, and calculates pressure in the pipes by calculating a voltage using a circuit simulator.

Specifically, in order to express the behavior of a fluid as an electric circuit network, the flow rate of a fluid that flows through each pipe is associated with a current, and pressure in the pipe is associated with a voltage. Accordingly, a model of an electric circuit network that can simulate the state of a fluid that flows through pipes is created (or envisioned). In addition, interconversion between a current in the modeled electric circuit network and the flow rate of fluid that flows through pipes is possible. In addition, interconversion between a voltage and pressure is also possible.

The simulation execution unit 11 then detects a voltage in each portion of the electric circuit network as a result of executing simulation, and converts the detected voltage into pressure, which is used as a result of simulating a pressure change. In addition, the simulation execution unit 11 can also acquire a vibration characteristic for each frequency or a time series vibration characteristic of each pipe included in the piping equipment, by executing the simulation.

Moreover, the simulation execution unit 11 can also build a simultaneous differential equation based on propagation characteristics of each pipe, instead of building an electric circuit network based on piping equipment. In this case, the simulation execution unit 11 calculates pressure vibrations through numerical value calculation of the simultaneous differential equation.

Furthermore, the simulation execution unit 11 can also obtain pressure vibrations of each pipe by calculating an impulse response using an existing fluid simulator. Furthermore, the simulation execution unit 11 can also simulate pressure vibrations in cooperation with another simulator that is not illustrated in FIG. 2. In this case, another simulator may also be provided by another external computer.

As described above, the stress analysis unit 12 calculates stress that occurs in pipes included in piping equipment, based on pressure vibrations acquired through simulation. Here, when pressure p is applied to a cylindrical pipe having a diameter d and a thickness t, stress σ acts so as to expand the pipe in its circumferential direction (so as to expand the diameter of the pipe). This stress is called hoop stress, and is calculated based on Formula 1 below.

$$\sigma = \frac{pd}{2t} \qquad \text{[Formula 1]}$$

Therefore, the stress analysis unit 12 converts the pressure vibrations obtained by the simulation execution unit 11 into stress using Formula 1 above, to calculate stress in each pipe. Note that the stress calculation method is not limited to Formula 1 above. The stress analysis unit 12 can also calculate stress that acts on a pipe, from pressure that acts on the inside thereof, based on the internal shape of the pipe.

Moreover, if the simulation execution unit 11 has acquired, by executing simulation, a vibration characteristic for each frequency or a time series vibration characteristic of each pipe included in the piping equipment, the acquired data is data composed of a plurality of points. Thus, in this case, the stress analysis unit 12 can also calculate stress by integrating vibration characteristics within a set range. In addition, the stress analysis unit 12 can also extract the maximum value and the average value of the acquired vibration characteristics.

Then, as described above, the output unit 14 outputs the stress calculated by the stress analysis unit 12, as an analysis result to the outside. At this time, the output unit 14 may output not only the calculated stress but also the data itself on pressure change acquired by the simulation execution unit 11. Furthermore, the output unit 14 can also output image data of an image in which stress differences are expressed visually, so as to allow the user to visually recognize stress in each pipe.

[Apparatus Operations]

Next, operations of the pipe diagnosis apparatus 10 in the first example embodiment will be described with reference to FIG. 3. FIG. 3 is a flow chart illustrating operations of the pipe diagnosis apparatus in the first example embodiment of the invention. The following description is given with reference to FIGS. 1 and 2. In addition, in the first example embodiment, a pipe diagnosis method is carried out by operating the pipe diagnosis apparatus 10. Thus, description of the pipe diagnosis method in the first example embodiment is substituted by the following description of operations of the pipe diagnosis apparatus 10.

Figure 3:
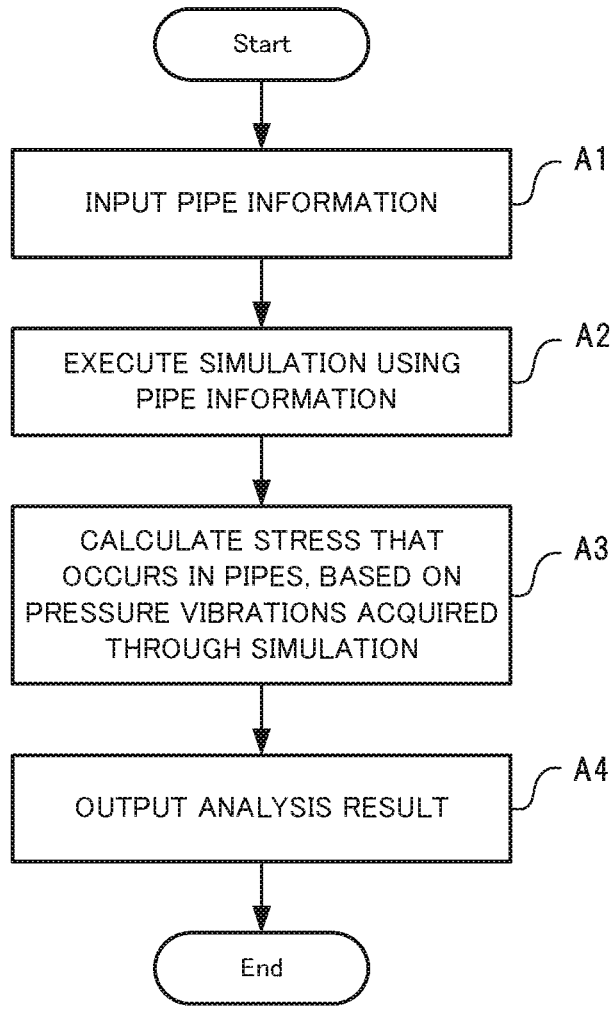
FIG. 3 is a flow chart illustrating operations of the pipe diagnosis apparatus in the first example embodiment of the invention.

As shown in FIG. 3, first, the input unit 13 accepts pipe information from the outside, and inputs the accepted pipe information to the simulation execution unit 11 (step A1).

Next, the simulation execution unit 11 simulates pressure vibrations in pipes included in the piping equipment, based on the pipe information input from the input unit 13 in step A1 (step A2). Specifically, the simulation execution unit 11 builds an electric circuit equivalent to the piping equipment, using the pipe information, and executes simulation using a voltage in the electric circuit as pressure in each pipe.

Next, the stress analysis unit 12 calculates stress that occurs in the pipes included in the piping equipment, based on the pressure vibrations acquired through simulation in step A2 (step A3).

After that, the output unit 14 outputs, as an analysis result, the stress calculated by the stress analysis unit 12 in step A3, to the outside (step A4). Specifically, the output unit 14 outputs a calculation result to a terminal apparatus connected to the pipe diagnosis apparatus 10, or a display apparatus connected to the pipe diagnosis apparatus 10.

As described above, according to the first example embodiment, stress that will occur in pipes in the future is calculated, and thus the user can estimate a rupture risk of the pipes, and can further determine appropriate replacement times and replacement order of the pipes. Accordingly, it is possible to replace pipes so as to effectively reduce rupture of the pipes.

[Program]

It suffices for a program in the first example embodiment to be a program that causes a computer to execute steps A1 to A4 shown in FIG. 3. By installing this program in a computer, and executing the program, the pipe diagnosis apparatus 10 and pipe diagnosis method in the first example embodiment can be realized. In this case, a processor of the computer functions as the simulation execution unit 11, the stress analysis unit 12, the input unit 13, and the output unit 14, and performs processing.

In addition, the program in the first example embodiment may also be executed by a computer system constituted by a plurality of computers. In this case, for example, a configuration may also be adopted in which each of the computers functions as one of the simulation execution unit 11, the stress analysis unit 12, the input unit 13, and the output unit 14.

Second Example Embodiment

Subsequently, a pipe diagnosis apparatus, a pipe diagnosis method, and a program in a second example embodiment will be described with reference to FIGS. 4 and 5. In addition, in the second example embodiment, an asset management apparatus in an example embodiment of the invention will also be described.

[Apparatus Configuration]

First, the configuration of the pipe diagnosis apparatus in the second example embodiment will be described with reference to FIG. 4. FIG. 4 is a block diagram specifically illustrating the configuration of the pipe diagnosis apparatus in the second example embodiment of the invention.

Figure 4:
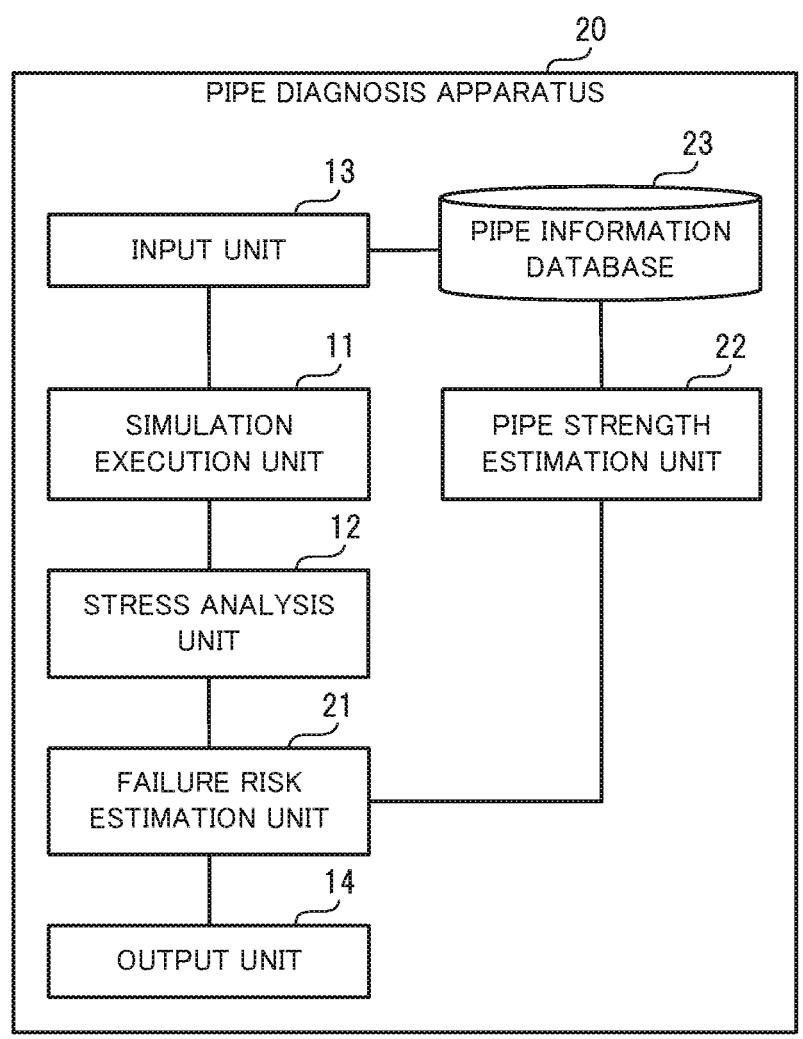
FIG. 4 is a block diagram specifically illustrating a configuration of a pipe diagnosis apparatus in a second example embodiment of the invention.

As shown in FIG. 4, a pipe diagnosis apparatus 20 in the second example embodiment is provided with a simulation execution unit 11, a stress analysis unit 12, an input unit 13, and an output unit 14 similar to the pipe diagnosis apparatus 10 in the first example embodiment shown in FIG. 2. Note that, in the second example embodiment, the pipe diagnosis apparatus 20 is different from the pipe diagnosis apparatus 10 in the first example embodiment as follows. Differences from the first example embodiment will be mainly described below.

As shown in FIG. 4, in the second example embodiment, the pipe diagnosis apparatus 20 is provided with a failure risk estimation unit 21, a pipe strength estimation unit 22, and a pipe information database 23 in addition to a configuration similar to that of the pipe diagnosis apparatus 10.

The pipe information database 23 stores pipe information that is used in the simulation execution unit 11. The pipe information stored in the pipe information database 23 includes information similar to the pipe information mentioned in the first example embodiment. In the present example embodiment, the input unit 13 inputs pipe information acquired from the pipe information database 23 to the simulation execution unit 11.

In addition, in the example in FIG. 4, the pipe information database 23 is formed in the pipe diagnosis apparatus 20, but, in the present example embodiment, the pipe information database 23 may also be provided by an external computer. For example, a database provided by a geographic information system (GIS: geographic information system) may also be used as the pipe information database 23.

The pipe information database 23 also stores strength data of pipes. The strength data is data indicating the strength of a target pipe. Examples of a method for measuring the strength of a pipe include a method for directly measuring a thickness, a magnetic flux leakage method (MFL method) for measuring strength using a magnetic field sensor, a remote field eddy current method (RFEC method) for measuring an excessive current, and a broadband electromagnetic method (BEM method). Note that, in order to carry out these methods, soil around a location in which the pipe is buried needs to be excavated in advance.

In addition, examples of a method for measuring the strength of a pipe without excavating soil in a state where the pipe is buried include a method for estimating a thickness from a sound speed, which is disclosed in Patent Document 1 above. In addition, a method in which a camera is inserted into a pipe, the surface of the pipe wall is observed, and the deterioration state of the pipe is roughly estimated is also included.

Furthermore, the pipe information database 23 may also store information for specifying the material, distance, time when the pipe was laid, place, and the like of each pipe, in addition to above-described pipe information and strength data. Furthermore, the pipe information database 23 may also store data on an S-N curve indicating the strength of a pipe, based on experimental data or document information, for each material and caliber of the pipe. Regarding this S-N curve, both data on a new pipe and data on a deteriorated pipe are preferably stored, and, in this case, in particular, the S-N curve of the deteriorated pipe is stored in association with the degree of strength of the pipe corresponding thereto.

The pipe strength estimation unit 22 estimates the strength of each pipe included in the piping equipment. Specifically, the pipe strength estimation unit 22 estimates the strength of a target pipe based on information stored in the pipe information database 23, and outputs an S-N curve.

Specifically, regarding a pipe whose strength has been directly measured, the pipe strength estimation unit 22 selects or generates an S-N curve corresponding to the measurement result. In addition, regarding a pipe whose strength has not been measured directly, the pipe strength estimation unit 22 generates an S-N curve of the target pipe, from the pipe information database 23, based on an S-N curve of a pipe whose material and caliber are the same as those of the target pipe.

Furthermore, if an S-N curve of a pipe having the same material and caliber as the target pipe is not stored in the pipe information database 23, the pipe strength estimation unit 22 calculates an S-N curve of the target pipe from the S-N curve of a pipe having the same material but a different caliber.

In addition, if the strength of the target pipe has not been measured, the pipe strength estimation unit 22 can also estimate the degree of deterioration based on the number of years that have elapsed since the target pipe was laid and the average lifespan of a pipe, and generate an S-N curve of the target pipe based on the estimated degree of deterioration.

The failure risk estimation unit 21 calculates, as a failure risk, an index whose value increases as the number of times stress occurs (the number of pressure changes) increases. Specifically, the failure risk estimation unit 21 first calculates the number of times stress occurs in a pipe, based on an analysis result of the stress analysis unit 12. Next, the failure risk estimation unit 21 calculates an index indicating a failure risk using the calculated number of times of occurrence of stress and the S-N curve of the target pipe estimated by the pipe strength estimation unit 22.

For example, assume that, after a pipe has been manufactured and installed through simulation, it is envisioned that a hoop stress change of an amplitude $\sigma_1$ occurs $n_1$ times, a hoop stress change of an amplitude $\sigma_2$ occurs $n_2$ times, and a hoop stress change of an amplitude $\sigma_3$ occurs $n_3$ times. The degree of fatigue D of the pipe at this time can be evaluated using Formula 2 below. A larger degree of fatigue D indicates a higher risk of breaking. The maximum value of the degree of fatigue D is 1. Therefore, the failure risk estimation unit 21 can calculate the degree of fatigue D using Formula 2 below, and output the calculated degree of fatigue D as a failure risk of the pipe.

$$D = \frac{n_1}{N_1} + \frac{n_2}{N_2} + \frac{n_3}{N_3} = \sum \frac{n_i}{N_i} \qquad \text{[Formula 2]}$$

In addition, if D=1 in Formula 2 above, an estimated time when a pipe will break is statistically indicated, and thus the failure risk estimation unit 21 can estimate the remaining lifespan of the pipe using this. Specifically, assuming that, when the current degree of fatigue is D and the present time is a time $\Delta t$, hoop stress changes of amplitudes $\sigma_1$, $\sigma_2$, $\sigma_3$, ..., $\sigma_i$ respectively occur $\Delta n_1$, $\Delta n_2$, $\Delta n_3$, ..., $\Delta n_i$ th times, the failure risk estimation unit 21 first calculates an increase rate $\Delta D/\Delta t$ of the degree of fatigue per unit of time using Formula 3 below.

$$\frac{\Delta D}{\Delta t} = \left(\frac{\Delta n_1}{N_1} + \frac{\Delta n_2}{N_2} + \frac{\Delta n_3}{N_3}\right)\frac{1}{\Delta t} = \frac{1}{\Delta t}\sum \frac{\Delta n_i}{N_i} \qquad \text{[Formula 3]}$$

Then, in Formula 3 above, a period of time (remaining lifespan) t' until D=1 is D+t' $\Delta D/\Delta t=1$, and thus the failure risk estimation unit 21 calculates the length of the time period (remaining lifespan) t', using Formula 4 below.

$$t' = \frac{\Delta t(1-D)}{\sum \frac{\Delta n_i}{N_i}} \qquad \text{[Formula 4]}$$

The output unit 14 then outputs, to the outside, the failure risk and remaining lifespan calculated by the failure risk estimation unit 21. Furthermore, the output unit 14 can also output image data of an image in which differences in the failure risk are visually expressed, so as to allow the user to visually recognize the failure risk for each pipe. In addition, the output unit 14 can also output a list in which a failure risk of each pipe is recorded.

[Apparatus Operations]

Next, operations of the pipe diagnosis apparatus 20 in the second example embodiment will be described with reference to FIG. 5. FIG. 5 is a flow chart illustrating operations of the pipe diagnosis apparatus in the second example embodiment of the invention. The following description is given with reference to FIG. 4 as appropriate. In addition, in the second example embodiment, a pipe diagnosis method is carried out by operating the pipe diagnosis apparatus 20. Thus, description of the pipe diagnosis method in the second example embodiment is substituted by the following description of operations of the pipe diagnosis apparatus 20.

Figure 5:
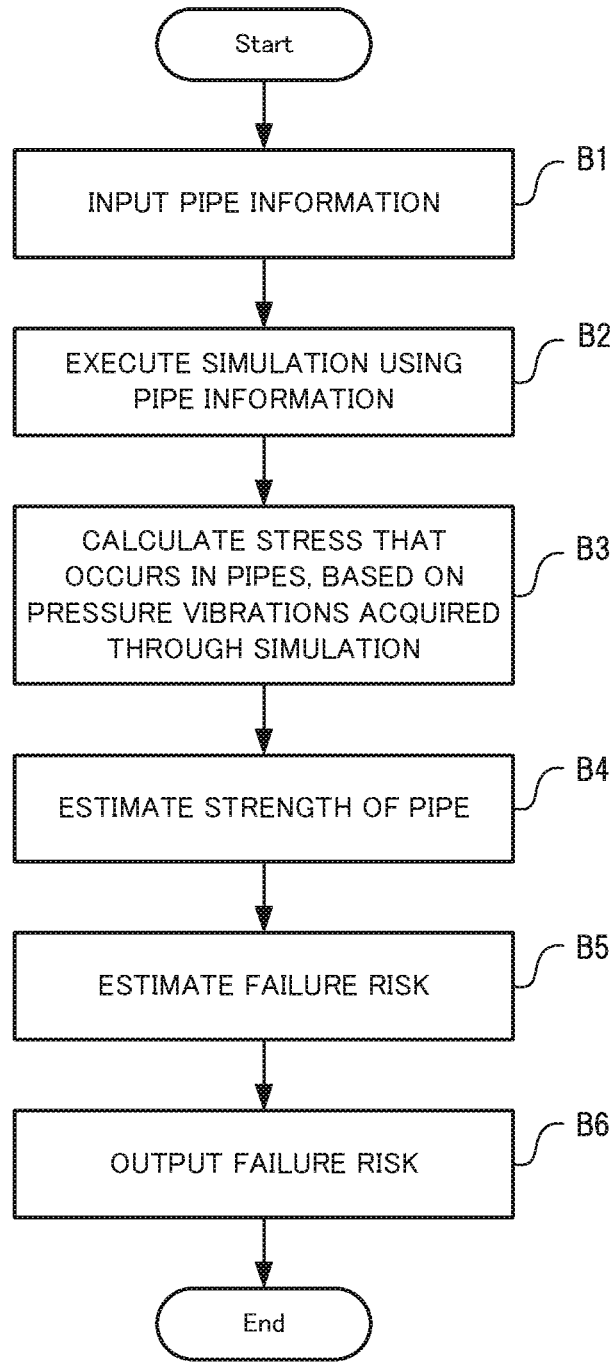
FIG. 5 is a flow chart illustrating operations of the pipe diagnosis apparatus in the second example embodiment of the invention.

As shown in FIG. 5, first, the input unit 13 acquires pipe information from the pipe information database 23, and inputs the acquired pipe information to the simulation execution unit 11 (step B1).

Next, the simulation execution unit 11 simulates pressure vibrations within pipes included in the piping equipment, based on the pipe information that has been input from the input unit 13 in step B1 (step B2). Step B2 is a step similar to step A2 shown in FIG. 3.

Next, the stress analysis unit 12 calculates stress that occurs in pipes included in the piping equipment based on the pressure vibrations acquired through the simulation in step B2 (step B3).

Next, the pipe strength estimation unit 22 estimates the strength of a pipe included in the piping equipment (step B4). Specifically, the pipe strength estimation unit 22 estimates the strength of a target pipe based on information stored in the pipe information database 23, and outputs an S-N curve.

Next, the failure risk estimation unit 21 calculates the number of times of stress occurs in the pipe, from the analysis result in step B3. Next, the failure risk estimation unit 21 calculates an index indicating a failure risk using the calculated number of times stress occurs and the S-N curve of the target pipe estimated in step B4 (step B5). In addition, in step B5, the failure risk estimation unit 21 also calculates the remaining lifespan of the pipe.

Next, the output unit 14 outputs, to the outside, the failure risk and remaining lifespan calculated by the failure risk estimation unit 21 (step B6). Specifically, the output unit 14 outputs the failure risk and remaining lifespan to a terminal apparatus connected to the pipe diagnosis apparatus 20 or a display apparatus connected to the pipe diagnosis apparatus 20.

As described above, according to the second example embodiment, future progression of deterioration of a pipe is estimated. Therefore, it is possible to estimate the probability that a pipe will rupture, and it is possible to further determine an appropriate replacement time and replacement order of the pipe. As a result, it is possible to efficiently suppress failure of piping equipment.

[Program]

It suffices for a program in the second example embodiment to be a program that causes a computer to execute steps B1 to B6 shown in FIG. 5. By installing this program in a computer, and executing the program, it is possible to realize the pipe diagnosis apparatus 20 and pipe diagnosis method in the second example embodiment. In this case, a processor of the computer functions as the simulation execution unit 11, the stress analysis unit 12, the input unit 13, the output unit 14, the failure risk estimation unit 21, and the pipe strength estimation unit 22, and performs processing.

In addition, the program in the second example embodiment may also be executed by a computer system constituted by a plurality of computers. In this case, for example, a configuration may also be adopted in which each of the computers functions as one of the simulation execution unit 11, the stress analysis unit 12, the input unit 13, the output unit 14, the failure risk estimation unit 21, and the pipe strength estimation unit 22.

[Asset Management Apparatus]

Figure 6:
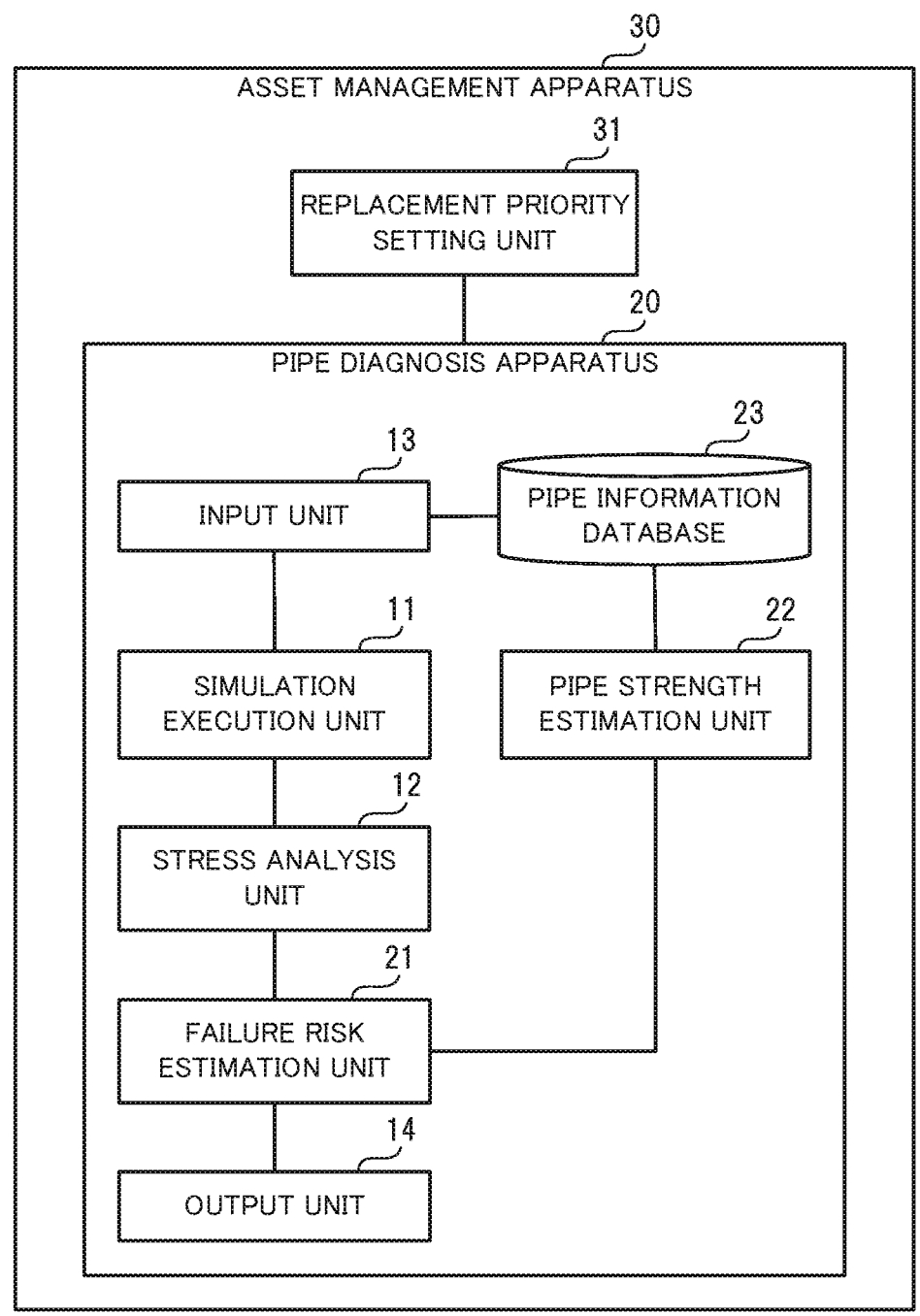
FIG. 6 is a block diagram illustrating a configuration of an asset management apparatus in an example embodiment of the invention.

Subsequently, an asset management apparatus in the present example embodiment will be described with reference to FIG. 6. FIG. 6 is a block diagram illustrating the configuration of the asset management apparatus in the example embodiment of the invention.

As shown in FIG. 6, an asset management apparatus 30 in the present example embodiment is an apparatus for managing piping equipment owned by a business. As shown in FIG. 6, the asset management apparatus 30 is provided with the pipe diagnosis apparatus 20 shown in FIG. 4 and a replacement priority setting unit 31.

When the failure risk estimation unit 21 in the pipe diagnosis apparatus 20 estimates a failure risk, the replacement priority setting unit 31 sets a replacement priority for each of the pipes that are included in the piping equipment, based on the estimated failure risk. Specifically, the replacement priority setting unit 31 sets a replacement priority for each pipe based on an index calculated by the failure risk estimation unit 21.

For example, the replacement order setting unit 31 sets a replacement order in which a pipe with the highest degree of fatigue D is ranked first. Accordingly, businesses can carry out replacement of pipes starting from a pipe with a high failure risk, and thus it is possible to perform efficient replacement for minimizing failures of pipes owned by the businesses.

Specific Example

Subsequently, operations of the pipe diagnosis apparatus 20 in the above second example embodiment will be described in detail with reference to FIGS. 7 to 10.

Figure 7:
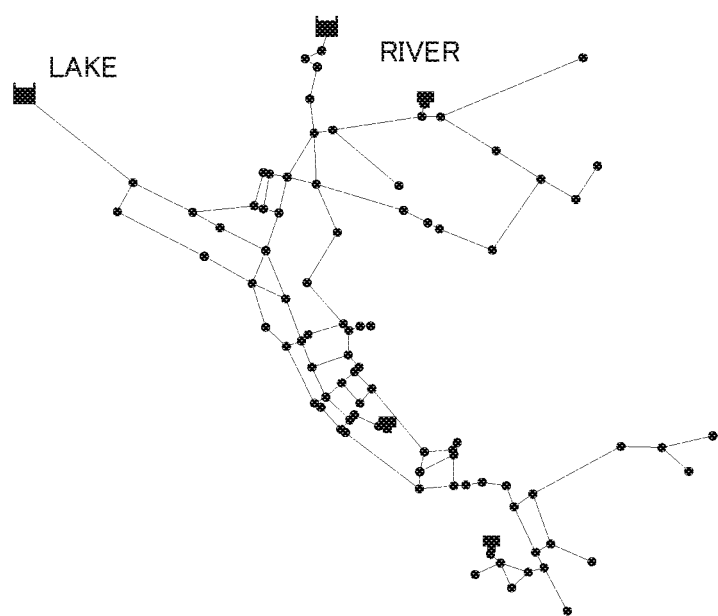
FIG. 7 is a diagram illustrating an example of connection information stored in a database of a geographic information system.

First, in the present specific example, assume that a database provided by a GIS (Geographic Information System) is used as the pipe information database 23. This database stores information regarding the water pipe network, specifically, the length, material, caliber, distance, time when the pipe was laid, and place of pipes in the water pipe network. In addition, similarly, the database also stores connection information regarding a water source and tank. FIG. 7 is a diagram illustrating an example of the connection information stored in the database of the geographic information system. In addition, the database also stores data on the relationship between the propagation speed of pressure vibrations and the material and caliber of the pipe, as well as strength data, and further stores analysis conditions such as a frequency at which analysis is to be performed.

Therefore, the user selects a water pipe network on the geographic information system via the input unit 13, and instructs the pipe diagnosis apparatus 20 to perform analysis. Accordingly, the simulation execution unit 11 executes simulation based on pipe information.

Figure 8:
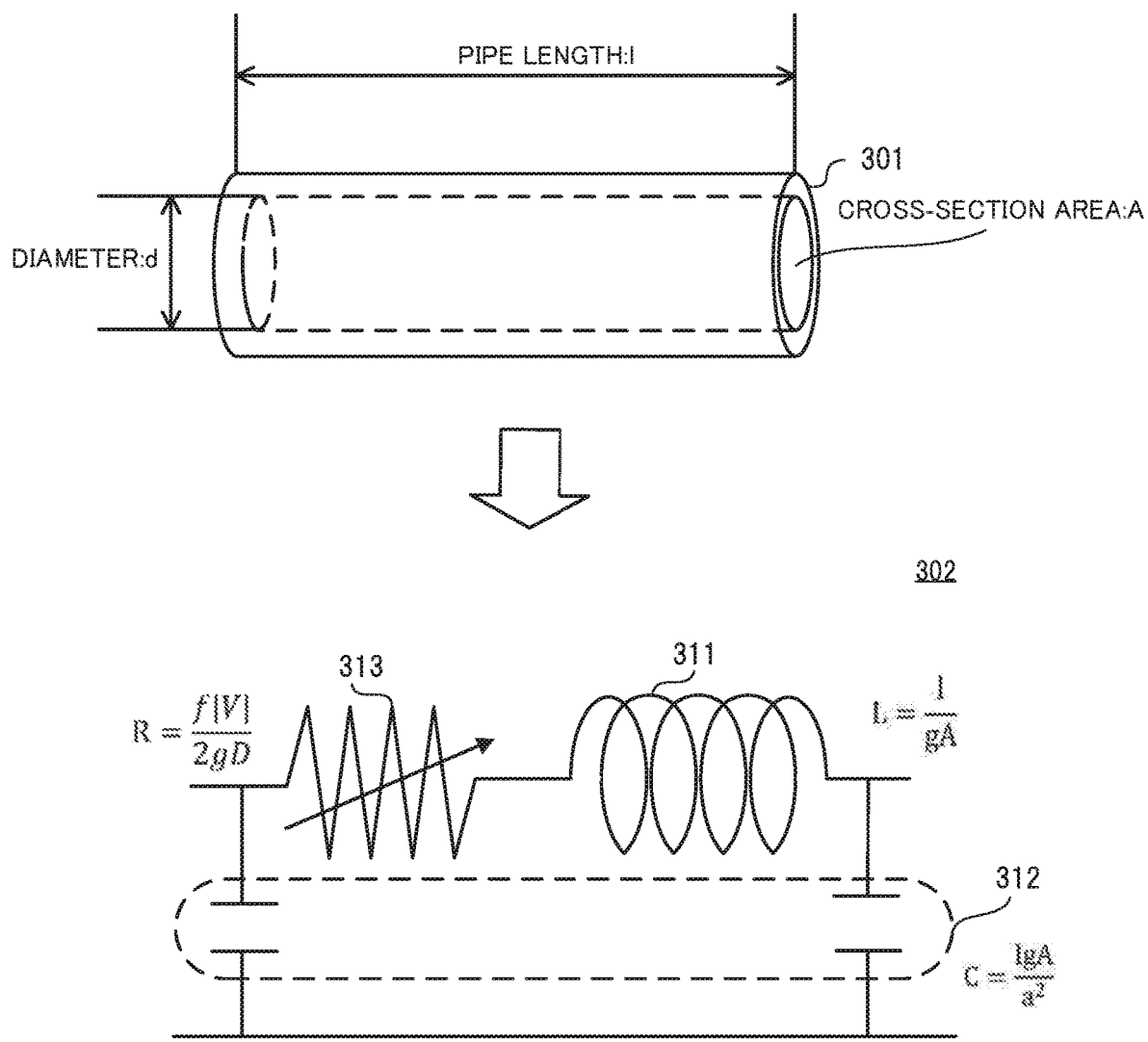
FIG. 8 is a diagram illustrating conversion from a water pipe network into an electric circuit network.

Specifically, the simulation execution unit 11 converts the water pipe network into an electric circuit network based on pipe information. Here, conversion from the water pipe network into an electric circuit network will be described with reference to FIG. 8. FIG. 8 is a diagram illustrating conversion from a water pipe network into an electric circuit network.

As shown in FIG. 8, a water pipe network can be expressed using an electric circuit network by comparing the relationship between the pressure and flow rate of a fluid that flows through a pipe 301 with the relationship between a voltage and current. For example, one pipe 301 included in the pipe network can be associated with an electric circuit 302 constituted by a coil 311, a capacitor 312, and a resistor 313, as shown in FIG. 8.

Accordingly, for example, the pipe 301 that connects two points can be expressed as the electric circuit 302. At this time, an inductance L of the coil 311, a capacitance C of the capacitor 312, and a resistance value R of the resistor 313 in the electric circuit 302 are obtained using Formula 5 below.

$$L = \frac{1}{gA}$$

$$C = \frac{1gA}{a^2}$$

$$R = \frac{f(V)}{2gD}$$

[Formula 5]

a: propagation speed of pressure vibrations
g: acceleration of gravity
A: pipe cross-section area
l: pipe length
V: flow speed of water
D: pipe diameter
f(V): pressure loss The propagation speed of pressure vibrations in Formula 5 can be calculated by acquiring the material and caliber of the pipe from the pipe information database 23, and using the acquired numerical values.

The simulation execution unit 11 can also use an electric element that expresses the magnitude of pressure that is lost due to the resistor 313 (pressure loss), instead of the resistor 313. The pressure loss, which is denoted by P, is expressed using Formula 6 below that is based on the Hazen-Williams formula, for example.

$$P = \frac{10.67 l Q^{1.85}}{C_Q^{1.85} D^{4.87}}$$

[Formula 6]

P: pressure loss (head loss)
$C_Q$: flow rate (flow speed) coefficient
D: pipe diameter
l: pipe length
Q: flow rate (obtained from product of flow speed and pipe cross-section area)

In Formula 6 above, the flow rate coefficient is a coefficient that indicates the flowability of a fluid in a pipe, in the Hazen-Williams formula, and is determined according to the material and degree of change over time of the pipe. Note that Formula 6 above is an example when the fluid that flows through the pipe 301 is water, and an appropriate formula is used as a formula that expresses a pressure loss, according to the type of fluid and various conditions.

In addition, the simulation execution unit 11 inputs data for performing simulation, to the generated electric circuit network. The data that is input may be a frequency at which analysis is to be performed, and the like. The simulation execution unit 11 executes, for example, analysis that uses an input signal with a small amplitude, which is called a "small signal analysis method", using the electric circuit network. Accordingly, a propagation characteristic for each frequency is analyzed. The small signal analysis method is an analysis technique in which, a non-linear element in the electric circuit network can be regarded as a linear element, under the assumption that the amplitude of the input signal is small. In the small signal analysis method, a small signal model constituted by a linear element is envisioned under the assumption that the amplitude of the input signal is small, and it is possible to calculate output for a voltage at a designated frequency.

Next, the stress analysis unit 12 calculates stress at each point. Specifically, amplitudes are integrated based on amplitude values at points obtained by the simulation execution unit 11, within the frequency range in which analysis was performed. The stress analysis unit 12 then calculates stress based on the integrated result, using Formula 1 above. Accordingly, stress in each pipe is calculated.

Figure 9:
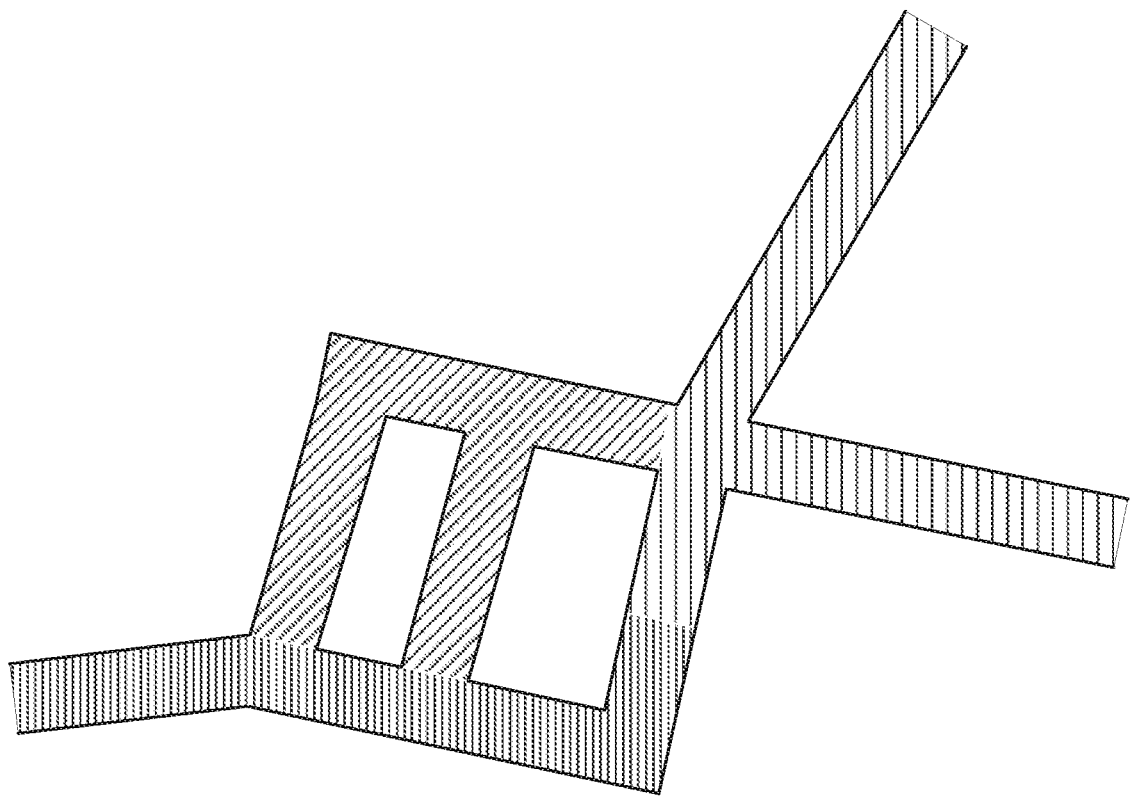
FIG. 9 is a diagram illustrating an example of an analysis result of stress in an example embodiment of the invention.

FIG. 9 is a diagram illustrating an example of a stress analysis result of the example embodiment of the invention. In the example in FIG. 9, the display mode of pipes differ according to the magnitude of stress that occurs in each pipe. In addition, if such a display mode is displayed, a place in which stress is likely to occur is visualized, and thus it is possible to present risk factors to the user. Thus, the output unit 14 can also output image data for displaying the screen shown in FIG. 9.

Figure 10:
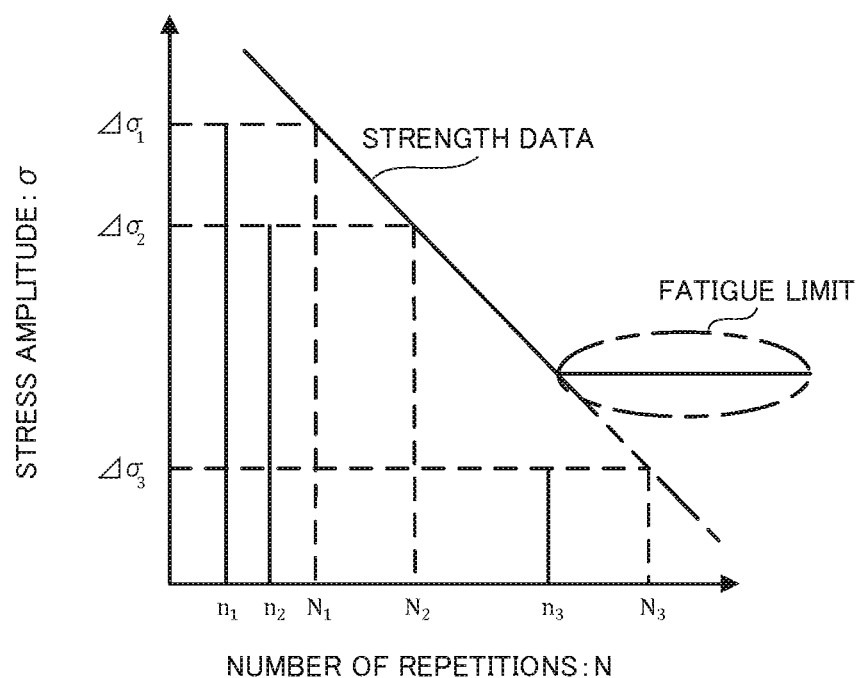
FIG. 10 is a diagram illustrating an example of strength data of a pipe used in an example embodiment of the invention.

Next, the pipe strength estimation unit 22 acquires the S-N curve shown in FIG. 10, as the strength data of a pipe, from the pipe information database 23. FIG. 10 is a diagram illustrating an example of the strength data of a pipe used in the example embodiment of the invention. The S-N curve shown in FIG. 10 indicates the relationship between a stress amplitude and the number of repetitions.

By comparing this S-N curve with the stress calculated by the stress analysis unit 12, the failure risk estimation unit 21 acquires the value of the number of repetitions that can be withstood. Specifically, the failure risk estimation unit 21 calculates the number of repetitions that remain and can be withstood, from the number of times stress occurs that is estimated through simulation, and uses it as a failure risk.

The output unit 14 presents the failure risk to the user, for example, by outputting pipes with a higher failure risk (with the number of repetitions that remain and can be withstood being smaller than or equal to a threshold value) as a list.

[Physical Configuration]

Figure 11:
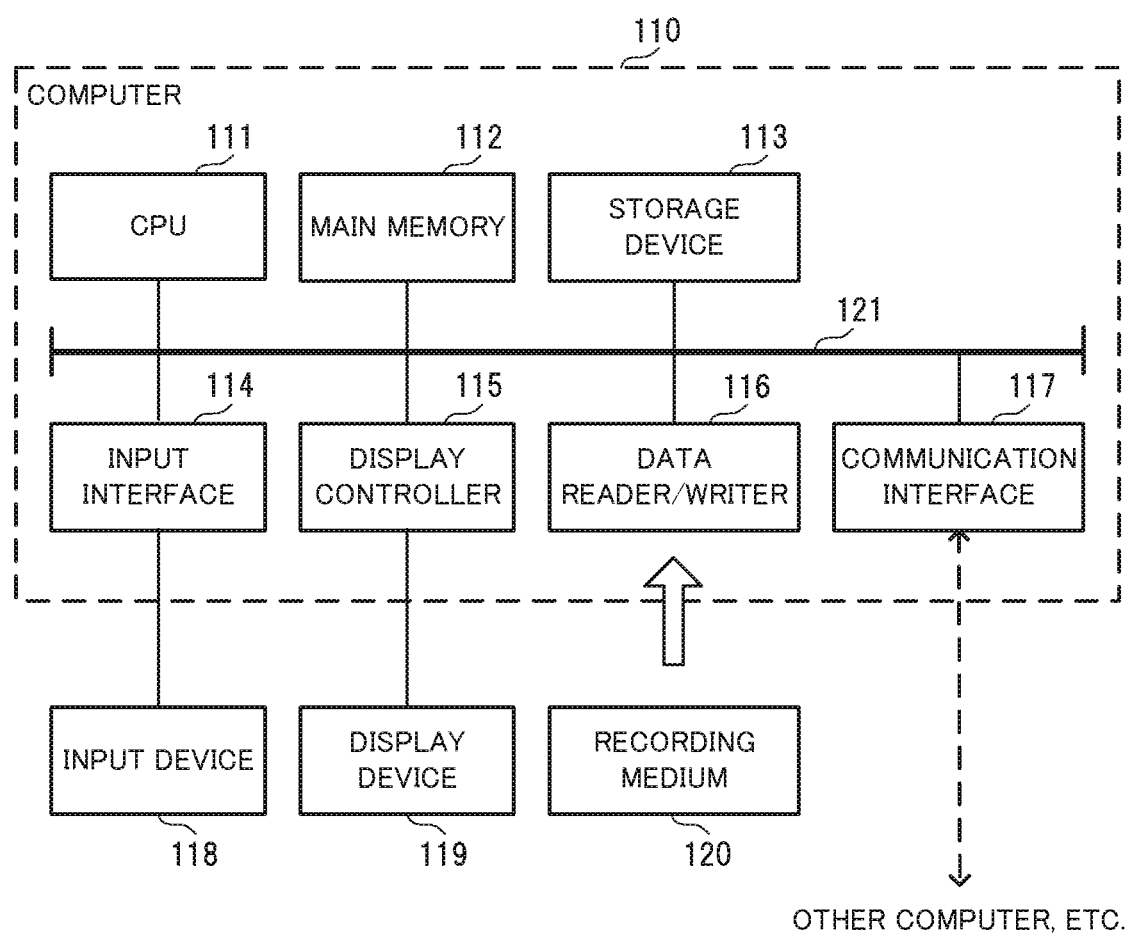
FIG. 11 is a block diagram illustrating an example of a computer that realizes the pipe diagnosis apparatuses in the first and second example embodiments of the invention.

Here, a computer that realizes the pipe diagnosis apparatuses by executing the programs in the first and second example embodiments will be described with reference to FIG. 11. FIG. 11 is a block diagram illustrating an example of the computer that realizes the pipe diagnosis apparatuses in the first and second example embodiments of the invention. In addition, in the present example embodiment, the asset management apparatus 30 can also be realized by the computer shown in FIG. 11.

As shown in FIG. 11, a computer 110 is provided with a CPU (Central Processing Unit) 111, a main memory 112, a storage apparatus 113, an input interface 114, a display controller 115, a data reader/writer 116, and a communication interface 117. These units are connected via a bus 121 to allow mutual data communication. Note that the computer 110 may also be provided with a GPU (Graphics Processing Unit) or an FPGA (Field-Programmable Gate Array) in addition to the CPU 111, or in place of the CPU 111.

The CPU 111 carries out various calculations by deploying programs (codes) in the present example embodiment stored in the storage apparatus 113 to the main memory 112, and executing these in a predetermined order. The main memory 112 is typically a volatile storage apparatus such as a DRAM (Dynamic Random Access Memory). In addition, the programs in the present example embodiment are provided in a state of being stored in a computer-readable recording medium 120. Note that the programs in the present example embodiment may also be programs distributed on the Internet connected via the communication interface 117.

In addition, specific examples of the storage apparatus 113 include a semiconductor storage apparatus such as a flash memory, in addition to a hard disk drive. The input interface 114 mediates data transmission between the CPU 111 and an input device 118 such as a keyboard or a mouse. The display controller 115 is connected to a display apparatus 119, and controls display on the display apparatus 119.

The data reader/writer 116 mediates data transmission between the CPU 111 and the recording medium 120, reads out a program from the recording medium 120, and writes a processing result from the computer 110 to the recording medium 120. The communication interface 117 mediates data transmission between the CPU 111 and another computer.

In addition, specific examples of the recording medium 120 include general-purpose semiconductor storage devices such as a CF (Compact Flash (registered trademark)) and an SD (Secure Digital), magnetic recording media such as a flexible disk, and optical recording media such as a CD-ROM (Compact Disk Read Only Memory).

Note that the pipe diagnosis apparatus 10 in the present example embodiment can also be realized by using hardware items corresponding to the units instead of a computer in which the programs are installed. Furthermore, a configuration may also be adopted in which a portion of the pipe diagnosis apparatus 10 is realized by a program, and the remaining portion is realized by hardware.

A portion or the entirety of the above example embodiment can be expressed as Supplementary notes 1 to 19 to be described below, but there is no limitation to the following description.

(Supplementary Note 1)

A pipe diagnosis apparatus comprising:

a simulation execution unit configured to simulate a pressure vibration in a pipe included in piping equipment to be diagnosed, based on pipe information for specifying a configuration of the piping equipment; and a stress analysis unit configured to calculate stress that occurs in a pipe included in the piping equipment, based on a pressure vibration acquired through simulation.

(Supplementary Note 2)

The pipe diagnosis apparatus according to Supplementary note 1, further comprising a failure risk estimation unit configured to estimate a failure risk of the piping equipment based on the stress calculated by the stress analysis unit and strength of a pipe included in the piping equipment.

(Supplementary Note 3)

The pipe diagnosis apparatus according to Supplementary note 1 or 2, wherein the simulation execution unit builds an electric circuit equivalent to the piping equipment using the pipe information, and executes the simulation using a voltage in the electric circuit as pressure in the pipe.

(Supplementary Note 4)

The pipe diagnosis apparatus according to Supplementary note 1 or 2, wherein the simulation execution unit acquires a vibration characteristic for each frequency or a time series vibration characteristic of a pipe included in the piping equipment, by executing the simulation, and the stress analysis unit calculates the stress by integrating vibration characteristics acquired by the simulation execution unit.

(Supplementary Note 5)

The pipe diagnosis apparatus according to any one of Supplementary notes 1 to 4, wherein the pipe information includes at least a connection relationship, length, diameter, internal friction coefficient, and propagation speed of a pressure wave, in a pipe included in the piping equipment.

(Supplementary Note 6)

The pipe diagnosis apparatus according to Supplementary note 5, wherein the piping equipment is a water pipe network, and the pipe information is water pipe network information stored in a geographic information system.

(Supplementary Note 7)

An asset management apparatus comprising:

a simulation execution unit configured to simulate a pressure vibration in a pipe included in piping equipment to be diagnosed, based on pipe information for specifying a configuration of the piping equipment;

a stress analysis unit configured to calculate stress that occurs in a pipe included in the piping equipment, based on a pressure vibration acquired through simulation;

a failure risk estimation unit configured to estimate a failure risk of the piping equipment based on the stress calculated by the stress analysis unit and a strength of a pipe included in the piping equipment; and a replacement priority setting unit configured to set a replacement priority of each pipe included in the piping equipment, based on the failure risk estimated by the failure risk estimation unit.

(Supplementary Note 8)

A pipe diagnosis method:

(a) a step of simulating a pressure vibration in a pipe included in piping equipment to be diagnosed, based on pipe information for specifying a configuration of the piping equipment; and (b) a step of calculating stress that occurs in a pipe included in the piping equipment, based on a pressure vibration acquired through simulation.

(Supplementary Note 9)

The pipe diagnosis method according to Supplementary note 8 further comprising (c) a step of estimating a failure risk of the piping equipment based on the stress calculated in the (b) step and a strength of a pipe included in the piping equipment.

(Supplementary Note 10)

The pipe diagnosis method according to Supplementary note 8 or 9, wherein, in the (a) step, an electric circuit equivalent to the piping equipment is built using the pipe information, and the simulation is executed using a voltage in the electric circuit as pressure in the pipe.

(Supplementary note 11)

The pipe diagnosis method according to Supplementary note 8 or 9, wherein, in the (a) step, a vibration characteristic for each frequency or a time series vibration characteristic of a pipe included in the piping equipment is acquired by executing the simulation, and in the (b) step, the stress is calculated by integrating vibration characteristics acquired in the (a) step.

(Supplementary Note 12)

The pipe diagnosis method according to any one of Supplementary notes 8 to 11, wherein the pipe information includes at least a connection relationship, length, diameter, internal friction coefficient, and propagation speed of a pressure wave, in a pipe included in the piping equipment.

(Supplementary Note 13)

The pipe diagnosis method according to Supplementary note 12 wherein the piping equipment is a water pipe network, and the pipe information is water pipe network information stored in a geographic information system.

(Supplementary Note 14)

A computer-readable recording medium that stores a program that contains instructions for causing a computer to execute:

(a) a step of simulating a pressure vibration in a pipe included in piping equipment to be diagnosed, based on pipe information for specifying a configuration of the piping equipment; and (b) a step of calculating stress that occurs in a pipe included in the piping equipment, based on a pressure vibration acquired through simulation.

(Supplementary Note 15)

The computer-readable recording medium according to Supplementary note 14, wherein the program further contains instructions for causing the computer to execute (c) a step of estimating a failure risk of the piping equipment based on the stress calculated in the (b) step and a strength of a pipe included in the piping equipment.

(Supplementary Note 16)

The computer-readable recording medium according to Supplementary note 14 or 15, wherein, in the (a) step, an electric circuit equivalent to the piping equipment is built using the pipe information, and the simulation is executed using a voltage in the electric circuit as pressure in the pipe.

(Supplementary note 17)

The computer-readable recording medium according to Supplementary note 14 or 15, wherein, in the (a) step, a vibration characteristic for each frequency or a time series vibration characteristic of a pipe included in the piping equipment is acquired by executing the simulation, and in the (b) step, the stress is calculated by integrating vibration characteristics acquired in the (a) step.

(Supplementary Note 18)

The computer-readable recording medium according to any one of Supplementary notes 14 to 17, wherein the pipe information includes at least a connection relationship, length, diameter, internal friction coefficient, and propagation speed of a pressure wave, in a pipe included in the piping equipment.

(Supplementary Note 19)

The computer-readable recording medium according to Supplementary note 18 wherein the piping equipment is a water pipe network, and the pipe information is water pipe network information stored in a geographic information system.

Although the invention has been described above with reference to the example embodiment above, the invention is not limited to the above example embodiment. Various modifications understandable to a person skilled in the art can be made in configurations and details of the invention, within the scope of the invention.

This application is based upon and claims the benefit of priority from Japanese Patent Application No 2017-062650, filed Mar. 28, 2017, the disclosure of which is incorporated herein in its entirety by reference.

INDUSTRIAL APPLICABILITY

As described above, according to the invention, it is possible to estimate future progression of deterioration of a pipe in piping equipment. The present invention is useful for applications in, for example, a system for distributing fluid using a pipe network, such as a pipe network system for delivering clean water from a water purification plant and pipelines for supplying oil and gas.

LIST OF REFERENCE SIGNS

10 Pipe diagnosis apparatus (first example embodiment)
11 Simulation execution unit
12 Stress analysis unit
13 Input unit
14 Output unit
20 Pipe diagnosis apparatus (the second example embodiment)
21 Failure risk estimation unit
22 Pipe strength estimation unit
23 Pipe information database
30 Asset management apparatus
31 Replacement order setting unit
110 Computer
111 CPU
112 Main memory
113 Storage apparatus
114 Input interface
115 Display controller
116 Data reader/writer
117 Communication interface
118 Input device
119 Display apparatus
120 Recording medium
121 Bus

The invention claimed is:

1. A pipe diagnosis apparatus comprising:
a processor;
a memory storing program code executable by the processor to:
construct an electric circuit equivalent to piping equipment by using pipe information specifying a configuration of the piping equipment acquired from a database and by corresponding voltage in the electric circuit as pressure vibration in a pipe of the piping equipment;
execute a simulation on the electrical circuit using a simulator to simulate the electric circuit to obtain the pressure vibration in the pipe of the piping equipment by performing small signal analysis over a range of frequencies;
when executing the simulation, acquire an amplitude of the pressure vibration in the pipe of the piping equipment for each frequency within the range;
calculate stress that stretches the pipe in a circumferential direction of the pipe of the piping equipment, based on a diameter and a thickness of the pipe and the pressure vibration acquired through the simulation, by integrating the amplitude of the pressure vibration over the range of the frequencies; and
estimate a degree of fatigue that has a value which increases as a number of times that stress occurs increases, and use the degree of fatigue as a failure risk of the piping equipment.

2. The pipe diagnosis apparatus according to claim 1, wherein the pipe information includes at least a connection relationship, length, diameter, internal friction coefficient, and propagation speed of a pressure wave of the pipe of the piping equipment.

3. The pipe diagnosis apparatus according to claim 2, wherein the piping equipment is a water pipe network, and the pipe information is water pipe network information stored in a geographic information system.

4. A pipe diagnosis method comprising:
constructing an electric circuit equivalent to piping equipment by using pipe information specifying a configuration of the piping equipment acquired from a database and by corresponding voltage in the electric circuit as pressure vibration in a pipe of the piping equipment;
executing a simulation on the electrical circuit using a simulator to simulate the electric circuit to obtain the pressure vibration in the pipe of the piping equipment by performing small signal analysis over a range of frequencies;
when executing the simulation, acquiring an amplitude of the pressure vibration in the pipe of the piping equipment for each frequency within the range;
calculating stress that stretches the pipe in a circumferential direction of the pipe of the piping equipment, based on a diameter and a thickness of the pipe and the pressure vibration acquired through the simulation, by integrating the amplitude of the pressure vibration over the range of the frequencies; and
estimating a degree of fatigue that has a value which increases as a number of times that stress occurs increases, and using the degree of fatigue as a failure risk of the piping equipment.

5. The pipe diagnosis method according to claim 4, wherein the pipe information includes at least a connection relationship, length, diameter, internal friction coefficient, and propagation speed of a pressure wave of the pipe of the piping equipment.

6. The pipe diagnosis method according to claim 5, wherein the piping equipment is a water pipe network, and the pipe information is water pipe network information stored in a geographic information system.

7. A non-transitory computer-readable recording medium that stores a program that contains instructions for causing a computer to execute:
constructing an electric circuit equivalent to piping equipment by using pipe information specifying a configuration of the piping equipment acquired from a database and by corresponding voltage in the electric circuit as pressure vibration in a pipe of the piping equipment;
executing a simulation on the electrical circuit using a simulator to simulate the electric circuit to obtain the pressure vibration in the pipe of the piping equipment by performing small signal analysis over a range of frequencies;
when executing the simulation, acquiring an amplitude of the pressure vibration in the pipe of the piping equipment for each frequency within the range;

calculating stress that stretches the pipe in a circumferential direction of the pipe of the piping equipment, based on a diameter and a thickness of the pipe and the pressure vibration acquired through the simulation, by integrating the amplitude of the pressure vibration over the range of the frequencies; and estimating a degree of fatigue that has a value which increases as a number of times that stress occurs increases, and using the degree of fatigue as a failure risk of the piping equipment.

8. The non-transitory computer-readable recording medium according to claim 7, wherein the pipe information includes at least a connection relationship, length, diameter, internal friction coefficient, and propagation speed of a pressure wave of the pipe of the piping equipment.

9. The non-transitory computer-readable recording medium according to claim 8, wherein the piping equipment is a water pipe network, and the pipe information is water pipe network information stored in a geographic information system.

* * * * *